United States Patent [19]

Swartz, Jr.

[11] Patent Number: 5,384,490
[45] Date of Patent: Jan. 24, 1995

[54] UNIVERSAL POWER DISTRIBUTION SYSTEM

[75] Inventor: Harry E. Swartz, Jr., Sun City, Calif.

[73] Assignee: UNISYS Corporation, Blue Bell, Pa.

[21] Appl. No.: 898,633

[22] Filed: Jun. 15, 1992

[51] Int. Cl.⁶ .................................... H02J 3/14
[52] U.S. Cl. ............................ 307/38; 307/41; 361/166
[58] Field of Search .................. 307/31, 38, 39, 40, 307/41, 242, 115; 361/116, 389, 709

[56] References Cited

U.S. PATENT DOCUMENTS

| | | | |
|---|---|---|---|
| 2,096,626 | 10/1937 | Crago | 307/41 X |
| 3,268,772 | 8/1966 | Kamei et al. | 361/388 |
| 3,631,325 | 12/1971 | Wenz | 361/387 |
| 3,770,977 | 11/1973 | McIntosh | 307/41 |
| 4,172,272 | 10/1979 | Schneider | 361/386 |
| 4,663,539 | 5/1987 | Sharp et al. | 307/38 |
| 4,769,555 | 9/1988 | Pequet et al. | 307/141 |
| 5,119,014 | 6/1992 | Kronberg | 307/41 X |
| 5,172,008 | 12/1992 | Odagiri | 307/41 |

OTHER PUBLICATIONS

G. E. SCR Manual, 1964, Third Edition, pp. 103 and 270.

*Primary Examiner*—A. D. Pellinen
*Assistant Examiner*—Fritz M. Fleming
*Attorney, Agent, or Firm*—Alfred W. Kozak; Mark T. Starr; Stanton D. Weinstein

[57] ABSTRACT

A power distribution and control system for computer modules having minimal parts and volume for attachment to a computer cabinet frame which acts as a heat-sink. The AC source is split into multiple (M) distribution channels, each of which is monitored by a control unit which operates a solid state relay which permits and/or cuts off line current in that channel. The control units are concatenated so that each current distribution channel operates through 3 through 5 AC cycles before the next succeeding distribution channel is activated. However, each control unit in the system can be individually programmed via external signals.

12 Claims, 11 Drawing Sheets

|   | CU1 | | | CU2 | | | CU3 | | |
|---|---|---|---|---|---|---|---|---|---|
|   | DIGITAL INPUT | | OUTPUT | DIGITAL INPUT | | OUTPUT | DIGITAL INPUT | | OUTPUT |
| 1 |   | L | 0 | H |   | 0 | H |   | 0 |
| 2 |   | L | 0 |   | L | 0 | H |   | 0 |
| 3 |   | L | 0 | H |   | 0 |   | L | 0 |
| 4 |   | L | 0 |   | L | 0 |   | L | 0 |
| 5 | H |   | 1 | H |   | 1 | H |   | 1 |
| 6 | H |   | 1 |   | L | 0 | H |   | 0 |
| 7 | H |   | 1 | H |   | 1 |   | L | 0 |
| 8 | H |   | 1 |   | L | 0 |   | L | 0 |

KEY

DIGITAL INPUT  H(HIGH)  L(LOW)

1 = OUTPUT PRESENT

0 = NO OUTPUT

CONDITIONS

1. JUMPERS REMOVED FROM CU1.CU2.CU3.

2. DIGITAL INPUT TO CU1.CU2.CU3.

3. DIGITAL INPUT TO TERMINALS 5C-6C.

FIG. 1A

UNIVERSAL POWER DISTRIBUTION SYSTEM

FIELD OF THE INVENTION

This disclosure involves the distribution of primary power from a single alternating current (AC) source to groups of AC loads located within a computer system.

BACKGROUND OF THE INVENTION

Modern day computer systems have many modules and printed circuit boards which involve specialized power requirements to be derived from the main AC source.

Because different voltages and currents are involved in different parts of a computer system, it is necessary that the original AC power input be distributed to various areas of AC application without destruction of the internal components due to power line surges or inrush currents.

The earlier forms of power distribution and control circuitry used in computer systems were very bulky and involved complex status and control circuitry which increased the size of the power distribution unit (PDU) and required additional cooling fans. Additional wiring and power supplies increased the size and packaging of these units. These earlier types of power distribution units required digital status and control circuitry located within them, requiring extra cabling, connector terminations, electronic and electromechanical components. This costly complex circuitry resulted in lower level of "meantime between failures" (MTBF).

Different voltages and currents are often required in different areas of a computer system. It is necessary to distribute the primary AC source power to various AC loads within the computer system without damage to internal components or disruption of computer operation which could occur as the result of power line surges or inrush currents.

Earlier designs of computer system power distribution units (PDUs) were physically large and bulky. This considerable size resulted in packaging difficulties and need for increased overall cabinet dimensions. Traditional PDU designs include digital status monitoring and control circuitry within the PDU. Their circuitry required additional DC power supplies, electromechanical contactors, wiring, connectors and cooling fans to accommodate the generated heat.

Typical prior art power distribution systems involving sequential application of power to various loads include such systems as described in U.S. Pat. No. 4,769,555, entitled "Multi-Time Delay Power Controller Apparatus with Time Delay Turn-on and Turn-Off" and also U.S. Pat. No. 4,663,539, entitled "Local Power Switching Control Subsystem". However, these systems cannot provide the versatility, flexibility and programmability inherent in the presently described system.

The inclusion of monitoring and control circuitry within the PDU creates six basic liabilities: 1) unnecessary electrical paths; 2) extra harnesses and cables; 3) increased troubleshooting time; 4) increased parts count; 5) lower reliability; 6) increased overall equipment costs.

The typical computer "disc drive" is controlled by circuitry mounted close to, or on the drive assembly. This circuitry, in turn, is controlled by an "external" disc controller outside both the drive assembly and the P.D.U.

Depending upon the specific design, the disc controller lines carry signals and/or DC levels to and from the PDU. The disc controller monitors the signals and/or levels and transfers the appropriate response to the drive circuitry. The circuitry involved is inappropriately located in the PDU, thus creating the liabilities described above.

A PDU (Power Distribution Unit) has four basic operational requirements: 1) select discrete paths over which primary power can be distributed to AC loads; 2) capable of remote ON/OFF control; 3) capable of local ON/OFF control; 4) capable of emergency power-down function. These basic characteristics apply to all PDUs.

The present invention provides all the basically valuable characteristics while eliminating extra circuitry formally located in the PDU, while also eliminating damaging in-rush currents.

Another frequent problem of these earlier types of power distribution units where AC loads were composed of AC- to -DC power supplies, involve the situation where excessively high input currents could be present at the power distribution unit input at the very instant that the alternating current power was applied. For example, if the power distribution unit (PDU) was connected to eighteen auxiliary power supplies each having individual inrush currents of 24 peak amperes, it would theoretically be possible for a resultant current surge of 432 peak amperes to occur and cause damage to circuitry components as a result.

The problem of excessive and damaging inrush currents are obstacles which occur in power supply distribution systems. Excessive electrical power line inrush currents cause temporary or permanent damage to electrical circuitry and/or cause equipment malfunctions or safety hazards.

An explanation of INRUSH CURRENT requires a perspective as follows:

1. "Inrush" current is not the same as surge current. The terms Inrush Current and Surge Current cannot be used interchangeably.

Inrush refers to values of load current amplitudes existing during the first few cycles of applied power to an electrical AC load. The most significant value of current exists during the first half cycle of applied power. "Inrush" is the result of the permanent design characteristic of the load.

"Surge Current" refers to a sudden increase in load current amplitude above a normal value of continuous constant amplitude. An example of surge current would be an increase to 50 amperes from a normal operating current of 5 amperes, as a result of a sudden load malfunction, or an external line stimulus such as a lightning strikes on a power line. Surge current is not a permanent characteristic of a properly designed load. Surge current, in this context, correlates to circuit damage or operational interruption. Any load can be designed to accommodate certain surges, rendering them non-destructive.

Both inrush and surge effects are dependent upon amplitude and duration of the condition. Lightning strikes (or any excessive line voltage increases) create the possibility of circuit voltage breakdown.

2. FIG. 5 shows a single resistor-capacitor load configuration connected to a single phase source. FIGS. 10 and 11 represent three different loads (power supply inputs A, B & C) connected in parallel to the same source, as shown in Block Diagram FIG. 9. FIG. 12 represents loads A, B and C connected to the power source as shown in Block Diagram, FIG. 13.

FIG. 8 shows the capacitor current curve and the resultant line current curve after power has been applied.

In FIGS. 6, 10, 11, and 12, the positive half of each cycle is shown.

Prior to closing the switch in FIG. 5, the capacitor has been discharged by the load resistor. Upon switch closure at time T1, FIG. 6 (input voltage peak) the capacitor appears as a short (zero ohms resistance) to the voltage applied to it. The line current rises to a maximum; limited by the amplitude of applied voltage, diode resistance, and effective series resistance of the capacitor. The load resistor current is insignificant because of the relatively higher resistance of the load, compared to the capacitor. In FIG. 6, between time T1 and the beginning of Cycle 2, the source voltage has decreased to zero, gone through the negative half cycle, and returned to zero. The diode cuts off the negative portion of the cycle, to cause zero line current during the last half of Cycle 1.

From time T1 to the beginning of Cycle 2, (FIG. 6) the capacitor C1 has partially discharged. Capacitor discharge is through the relatively high resistance of the load resistor. Full discharge cannot occur before the beginning of Cycle 2. At the start of Cycle 2, the capacitor has a partial charge remaining in it. The partial charge on the capacitor permits it to attain a full charge during the positive half of Cycle 2 with less current flow. The peak capacitor current during Cycle 2 is lower than Cycle 1 because of the partial charge present at the start of Cycle 2.

In Cycle 3, FIG. 6, the exact same capacitor charge and discharge sequence occurs, with line current fluctuations leveling off at some value. The charge and discharge fluctuations in the capacitor, beginning at time T3, create an AC current known as "ripple".

The preceding explanation was related to a standard half wave power supply configuration. When a full wave configuration is used, both halves of the input AC power cycles will be rectified. The resultant line current would appear similar to FIG. 7.

FIG. 8 shows line current inrush with a "full wave" power supply configuration. Each half cycle decreases in amplitude by a lesser amount until the current level is stabilized. This is because the same capacitor is being charged during both halves of the rectified cycle.

The prior half wave explanation in FIG. 7 assumed switch closure at the instant the AC input voltage first half cycle was at its peak. That is the time when maximum inrush current occurs. If the switch has been closed at any other time during that first half cycle, an inrush current of lower magnitude would have been observed.

The following discussion describes the additive effects of three inrush currents created by three power supplies connected in parallel to the same source as shown in FIG. 9 where inrush currents occur simultaneously to each of the power supplies A, B, C.

When a group of power supplies is connected in parallel and controlled by one switch, power is applied to all supplies at the same instant. Slight differences in component characteristics may cause each of the supplies to charge its capacitor at a different rate. FIG. 10 shows inrush currents to power supplies A, B and C. Each power supply, operated "alone", would have a peak current of 24 amps. Each line current is displaced from the others by some time period dependent upon component characteristics—even though input power has been applied to all supplies at the same instant.

In FIG. 10 power supply A and B line currents are shown displaced. At the instant power supply A current has peaked at 24 amps, power supply B current has risen to 10 amps. The vertical addition of the two currents on the graph, results in a 34 ampere line current at that instant and shown by the dashed line. At this instant, the resultant line current amplitude is greater than the current in either power supply A or B.

Referring to FIG. 11, three power supplies A, B and C are connected in parallel. All components characteristics are identical. Power has been applied to all supplies at the same instant. Capacitor charge times are identical. Each individual supply has an inrush current of 24 amperes. All three current peak times are coincident. Under these conditions, the vertical addition of the currents is seen to be 72 amperes.

If, for example, 20 power supplies were connected in parallel, with 8 ampere running currents and 24 ampere inrush currents, the running current would be 160 amperes. With uncontrolled inrush currents, the possibility of a 480 ampere inrush is present. The danger to circuitry and components is clearly evident in this situation.

A solution to the problem is to "sequence" power to the individual power supplies. Referring to FIG. 12, when power is applied to power supply A for three full cycles, the first half cycle inrush will have dissipated and the line current stabilized at 8 amperes. At this time, power is applied to power supply B for three full cycles. When power supply B has stabilized, power can be applied to power supply C without regard to further timing.

In the group of 20 supplies previously mentioned, the greatest inrush current to be expected would be sum of the first nineteen (each stabilized after 3 cycles) 8 amp running currents (152 amps) plus the inrush of the last supply to turn on, (24 amps). Under controlled conditions, the maximum inrush would then be 176 amps.

The present high current power distribution control system eliminates the earlier need for on board power supplies, excessive hardware wiring, and digital electronic circuitry—thus permitting the physical size of the power distribution unit to be significantly reduced. Further, since fewer parts and components are involved reliability is consequently improved and the operational life of the power distribution unit considerably lengthened.

The simplified circuitry permitted by the presently described power distribution unit system permits an almost universal usage in any number or types of electronic systems without the necessity to change the basic power distribution unit circuitry. Further, the need for repairs to the power distribution unit is considerably reduced and involves a reduced inventory of extra spare parts. Additionally, the minimized power distributor unit and system lends itself to efficient cooling by attachment to the cabinet frame as indicated in FIGS. 4A and 4B. Thus the metallic frame, $A_f$, is so based as to provide solid contact, as seen in FIG. 4B, to each control unit, CU1, CU2, CU3, and to each solid state relay, $K_1$, $K_2$, $K_3$, and to the circuit breaker units $CB_1$, $CB_2$, $CB_3$. The metallic frame also functions as a heat sink for the control units (CU), the solid state relay units (K), and the circuit breaker units (CB).

It is an object of the present system to reduce the damaging inrush current which can occur by dividing the power sequencing function into separate turn-on periods. By sequencing the application of power to at least three separate groups of power supplies, it is possible to reduce the instantaneous result if, for example, eighteen power supplies were powered up simultaneously.

It is a further object to provide a compact power distribution system which can be installed onto a cabinet frame which holds digital modules where the frame can act as a heat sink.

Another object of the system is to provide a programmable arrangement for individually controlling each one of a multiple set of power channels.

SUMMARY OF THE INVENTION

The present disclosure provides an alternating current power distribution system from a single AC input source which is then distributed to multiple receipt points to provide AC current for localized power supplies within the computer system.

The main AC input line is split up into three separate AC output distribution lines each of which of these three output distribution lines is controlled by a power distribution control unit.

Each of the three output legs of the AC power distribution unit (PDU) are sequenced by solid state relays and under the control of the power distribution unit control circuit so that power sequencing will occur such that the output currents to each of the three AC outputs will occur in a sequential basis one after the other and not simultaneously, thus preventing the possible huge inrush currents which could damage the components of the system.

The PDU is also efficiently downsized in the number of components required and in spatial volume to permit internal cabinet attachment using the cabinet metal frame as a heat sink for cooling.

Further, since each distribution line has its own control circuit, then external signals to each control circuit can be used to program the "on-ness" or "off-ness" of a given distribution line.

BRIEF DESCRIPTION OF THE DRAWINGS

FIG. 1A is a truth table indicating how various distribution lines can be programmed for activation or deactivation.

DESCRIPTION OF PREFERRED EMBODIMENT

Figure 1:
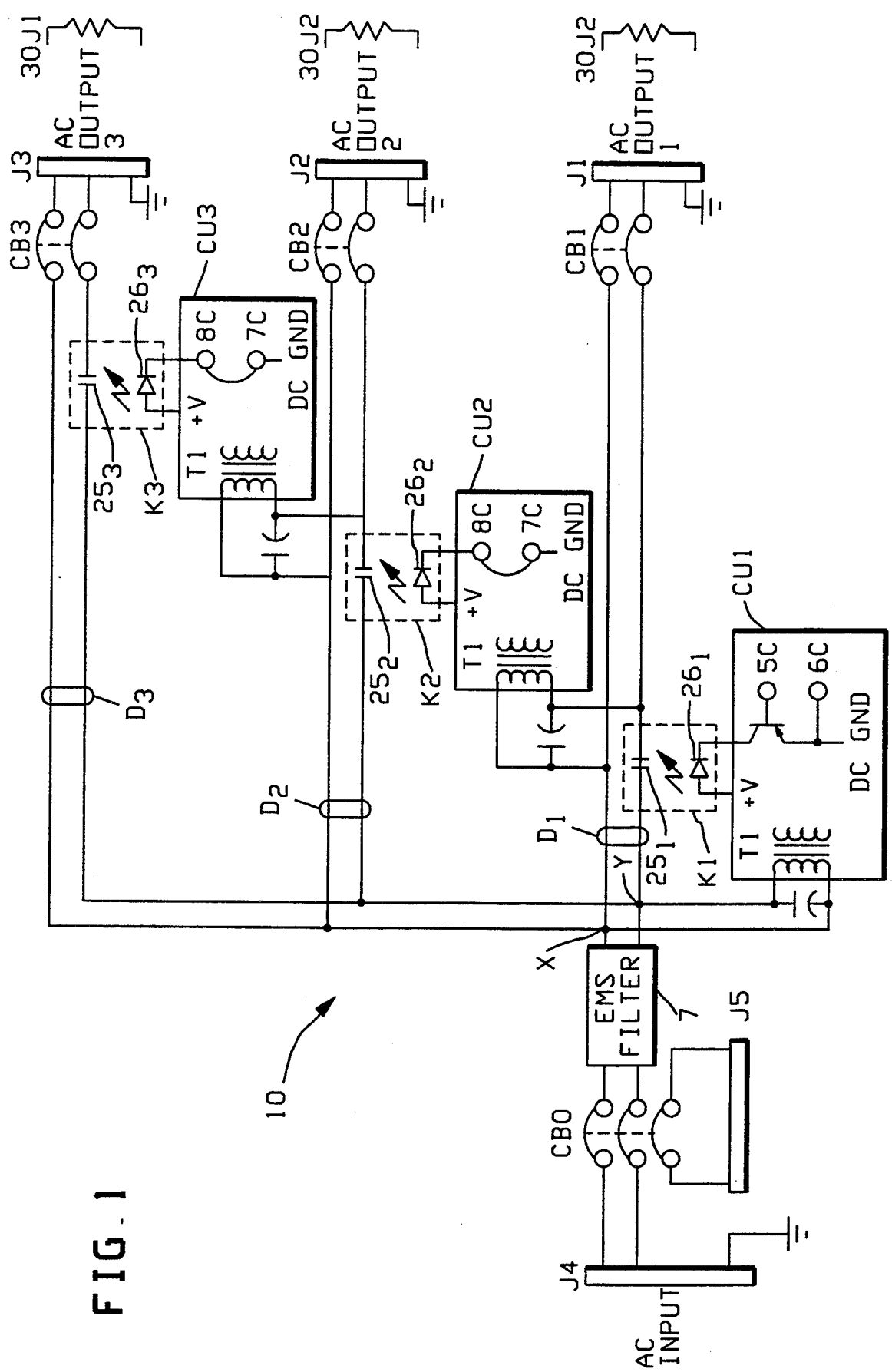
FIG. 1 is a system drawing of the distribution network showing how the main AC input is split into three separate AC output supply lines each of which is controlled by a power distribution unit control unit.
Figure 2:
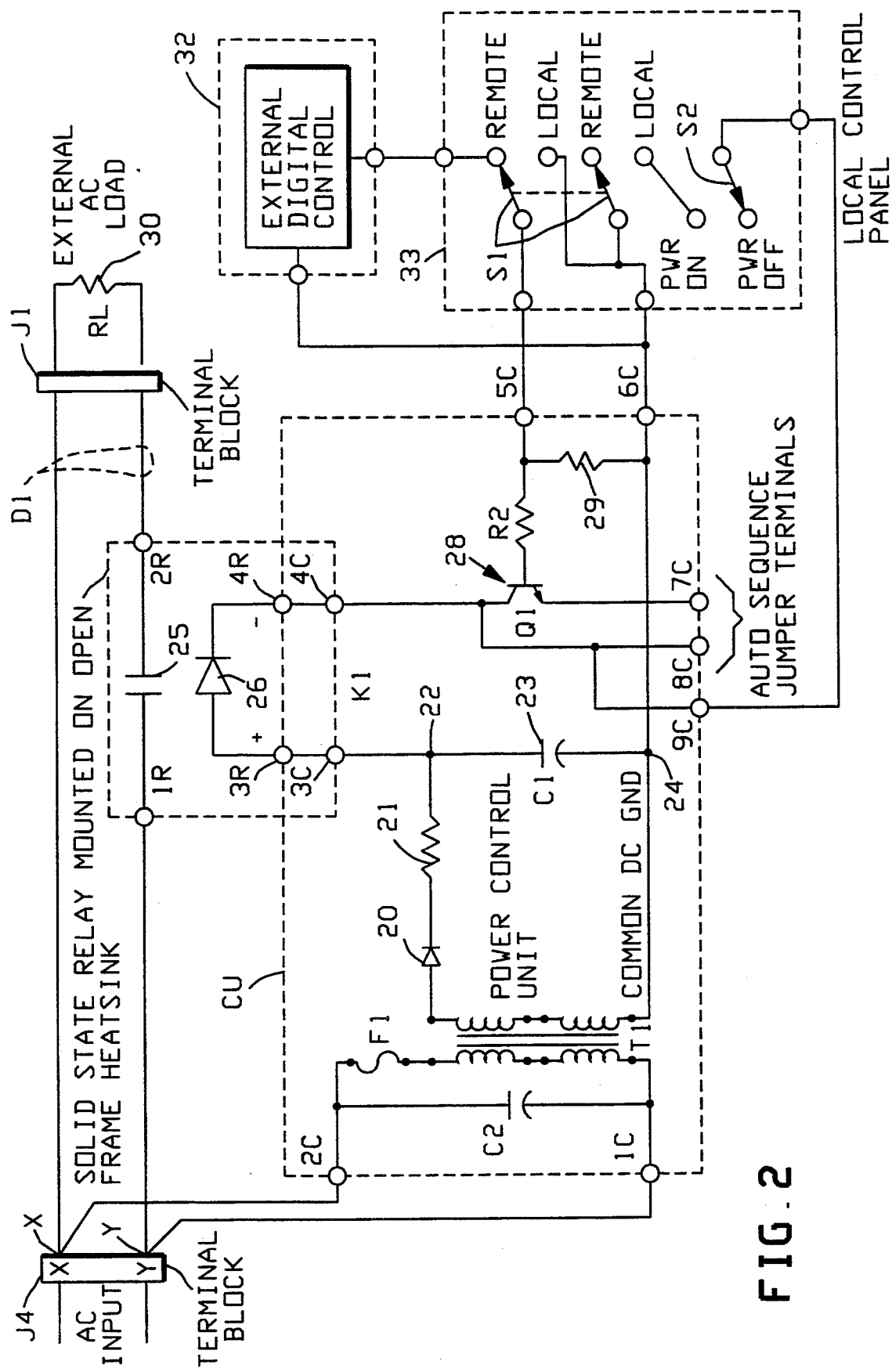
FIG. 2 is a circuit drawing illustrating each of the power distribution unit circuits used in FIG. 1 an interconnections for local control and external remote control units.

Referring to FIG. 1 there is seen the main alternating current input connector J4 which can receive and operate under a voltage range from 80 volts AC RMS to 254 volts RMS at between 50 to 60 Hertz which passes through the interference filter 7 onto the terminals X and Y. The terminals X and Y are also shown in FIG. 2 which will be discussed hereinafter.

The distribution system 10 indicates how the main input power at terminals X and Y is then split into 3 separate lines which provide alternating current outputs at the terminals J1, J2 and J3. A load resistor is typically indicated in each of these cases and indicated as resistor 30J1, 30J2, and 30J3. The distribution system is arranged in a concatenated hierarchal arrangement where the earlier empowered distribution channels (line-pairs) subsequently empower later energized channels.

The original primary current input supplied at terminals X and Y is then split up into three separate parts of distribution lines designated as D1, D2 and D3.

The current and power in the distribution line D1 is controlled by a solid state relay K1 which is under the monitoring of a control unit CU1.

This control unit is described in more detail in subsequent discussions in connection with FIG. 2.

Likewise, the alternating current distribution line D2 is under the control of solid state relay K2 which controls the current and power permissible to the output over the output terminal J2. Similarly, the distribution lines D3 are under the control of a solid state relay K3 which determines the on/offness of current and power to the AC output J3.

Figure 3:
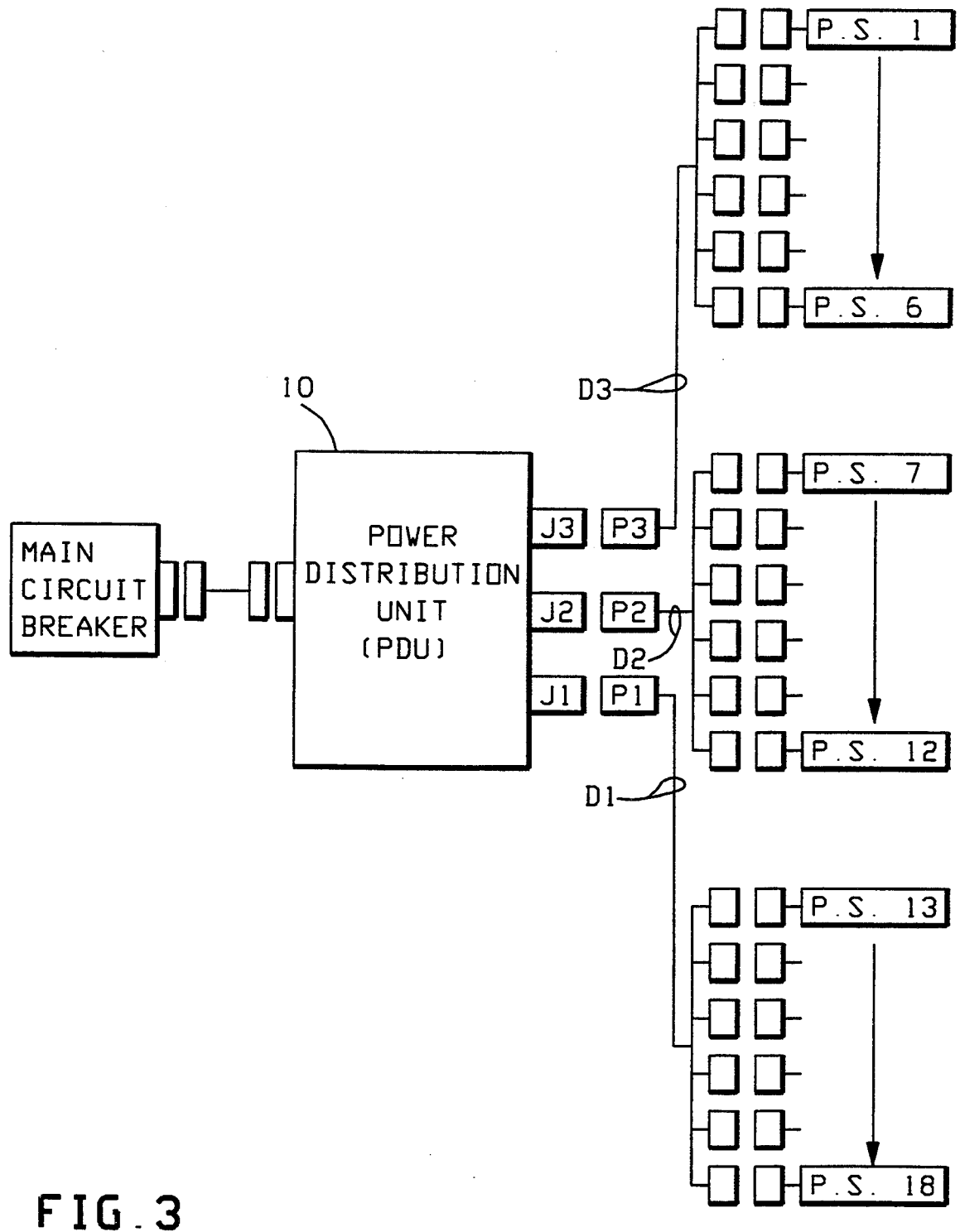
FIG. 3 is a block diagram showing how the power distribution unit takes a single input AC line and splits it into multiple (three) separate AC power outlets each of which outlet can handle a group of, for example, six localized power supplies.
Figure 4A:
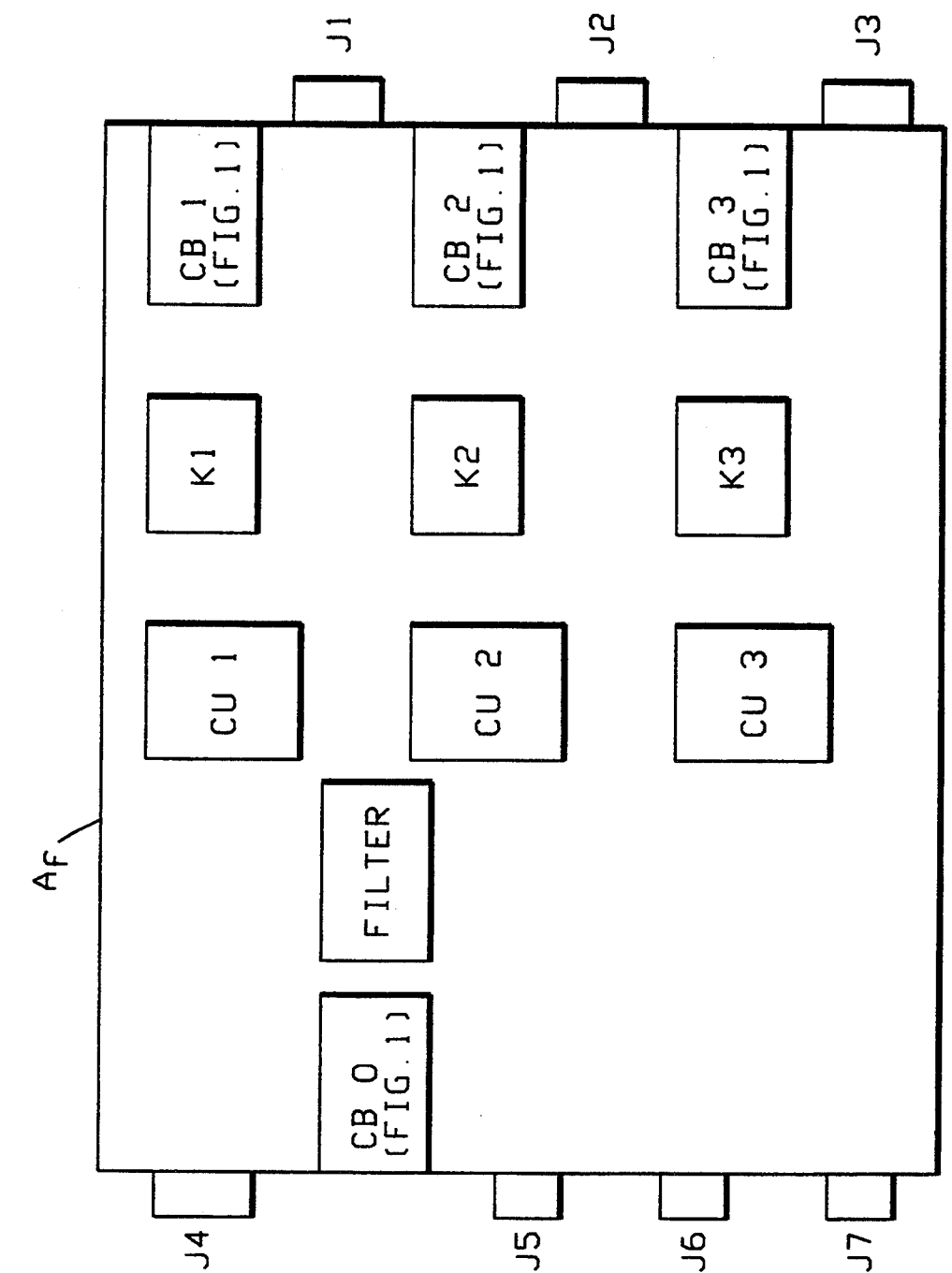
FIG. 4A is a top view drawing showing the packaging arrangements for the power distribution unit in the metallic frame of a cabinet.

Reference to FIG. 3 will indicate how each of the distribution lines D1, D2, and D3 provide power to six separate power supply units in different locations. FIG. 4A is a top or plan view of the power distribution unit (RDU) showing a suitable layout for the various elements. A metallic base plate, $A_f$, is shown holding a number of component units. The primary AC input is designated J4, the circuit breaker CB0 (also seen in FIG. 1) connects to a filter corresponding to item 7 of FIG. 1. Then, there is seen the location of the three control units, CU1, CU2, and CU3 which correspond to those shown in FIG. 1. The solid state relays K1, K2, and K3 are shown which also correspond to those seen in FIG. 1. In FIG. 4A there is seen the circuit breakers CB1, CB2, and CB3 which provide for the three alternating current outputs designated J1, J2, and J3.

Figure 4B:
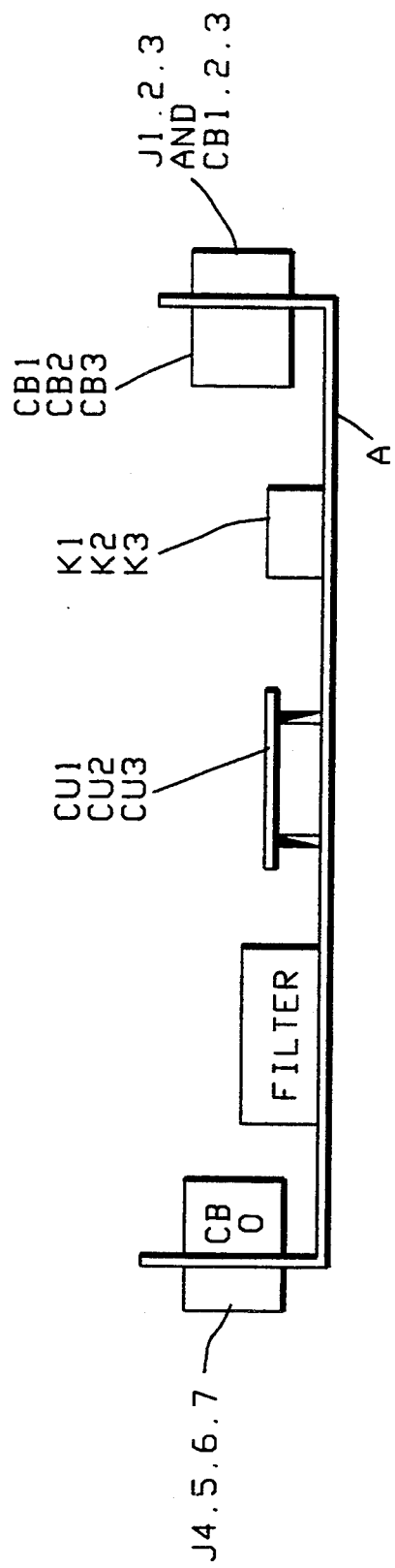
FIG. 4B is a drawing indicating how a cabinet frame is used as a heat sink for the power distribution unit.
Figure 5:
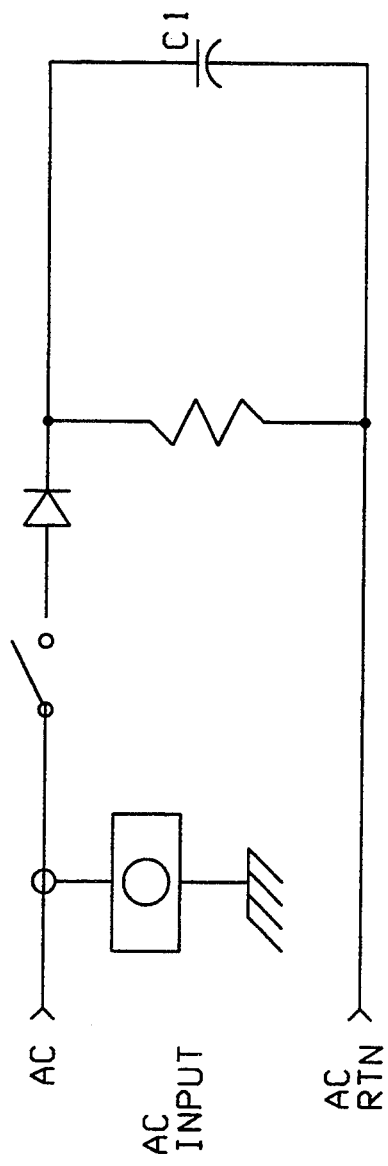
FIGS. 5-13 are a series of schematic diagrams for illustrating the problems involved with inrush currents in power supply distribution units.
Figure 6:
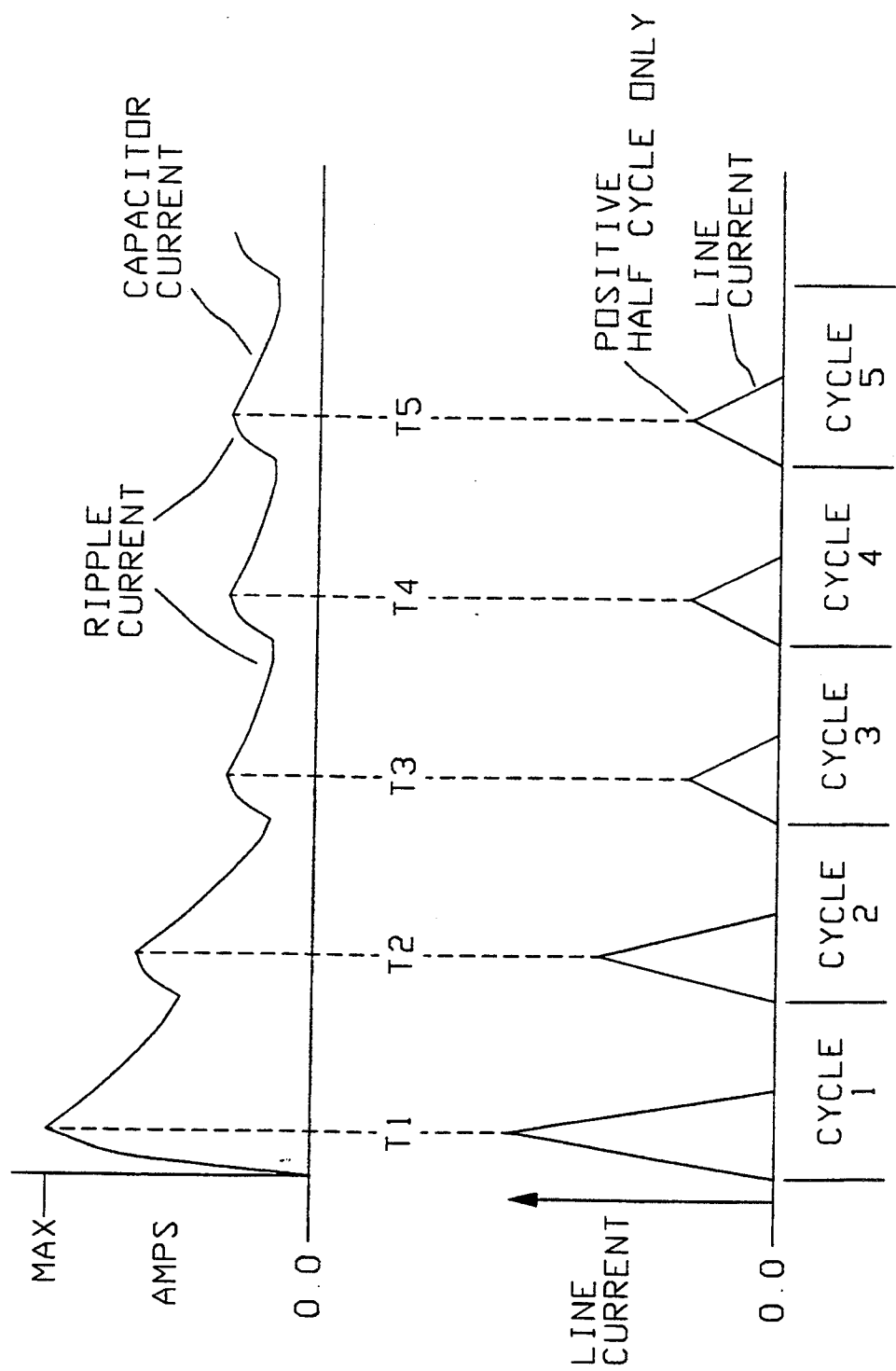
Figure 7:
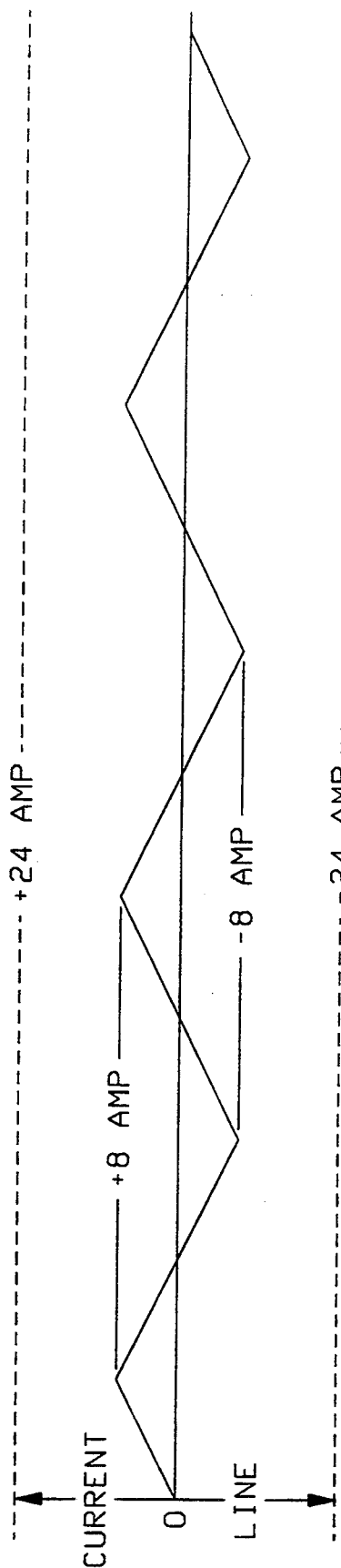
Figure 8:
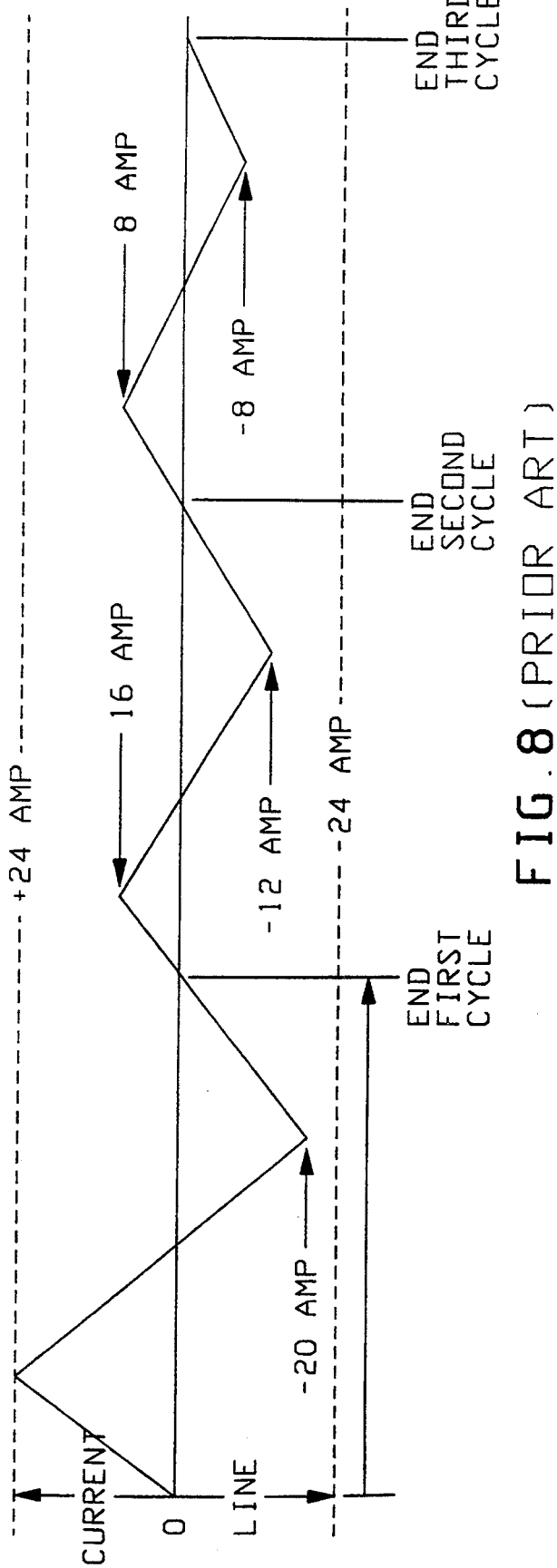
Figure 9:
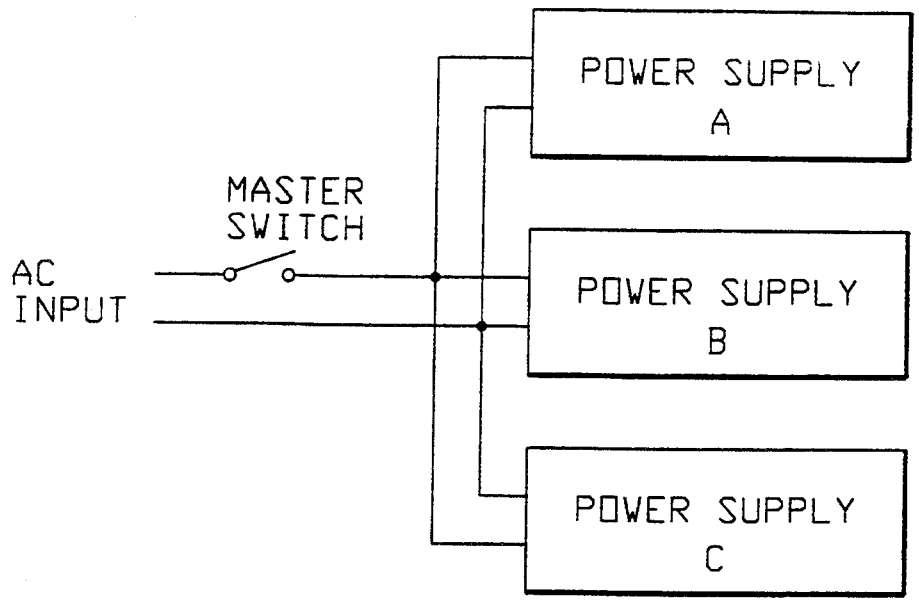
Figure 13:
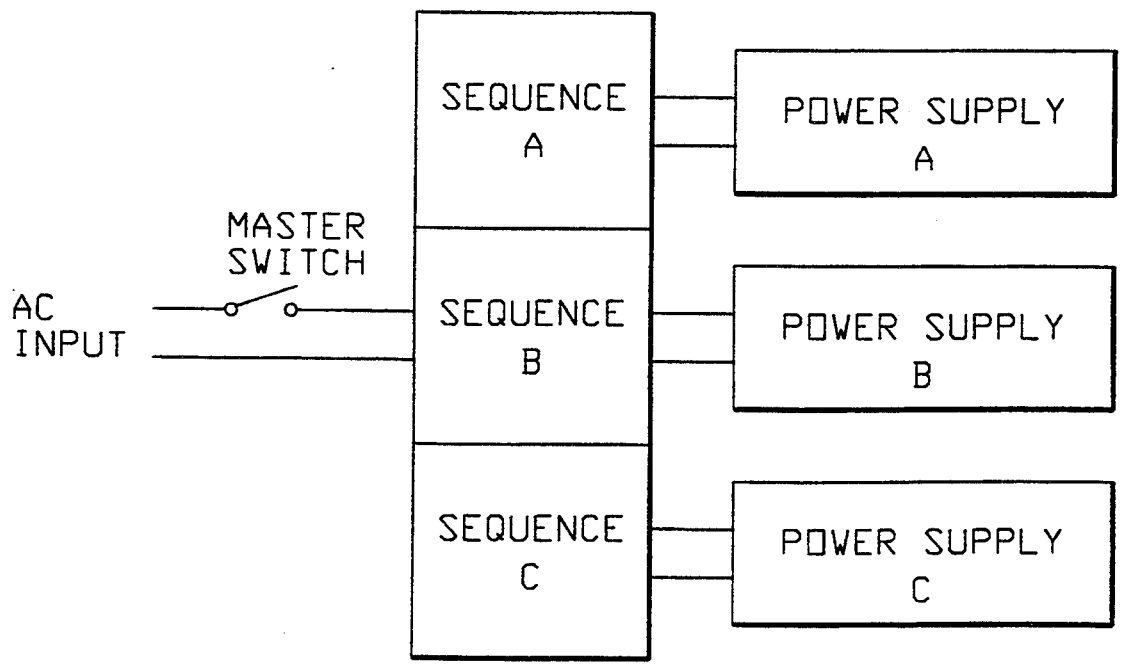
Figure 10:
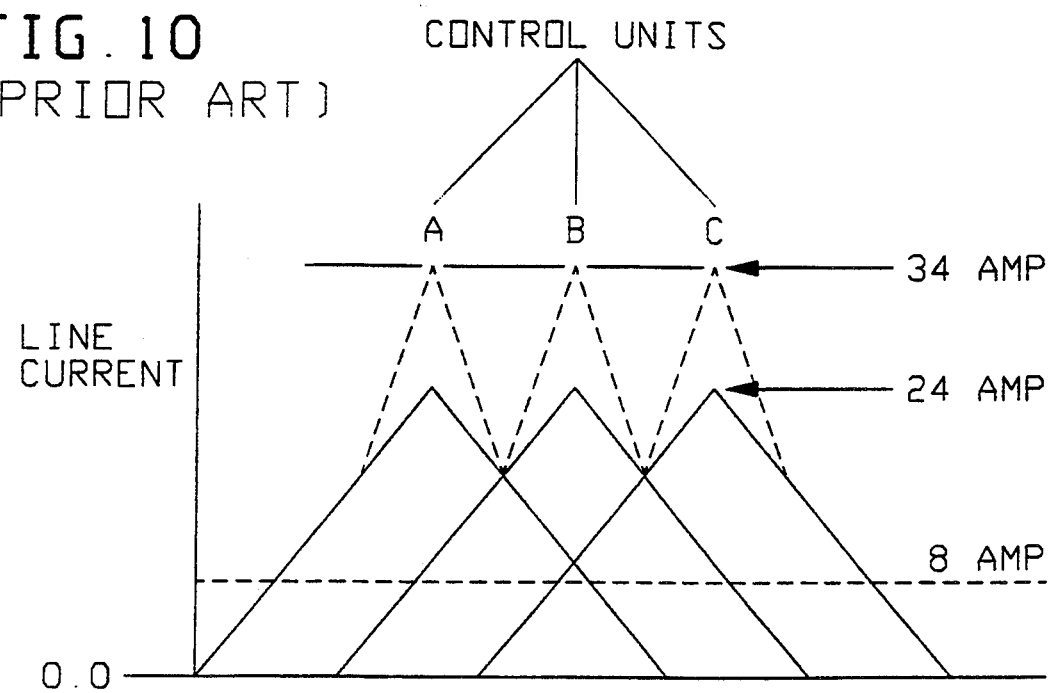
Figure 11:
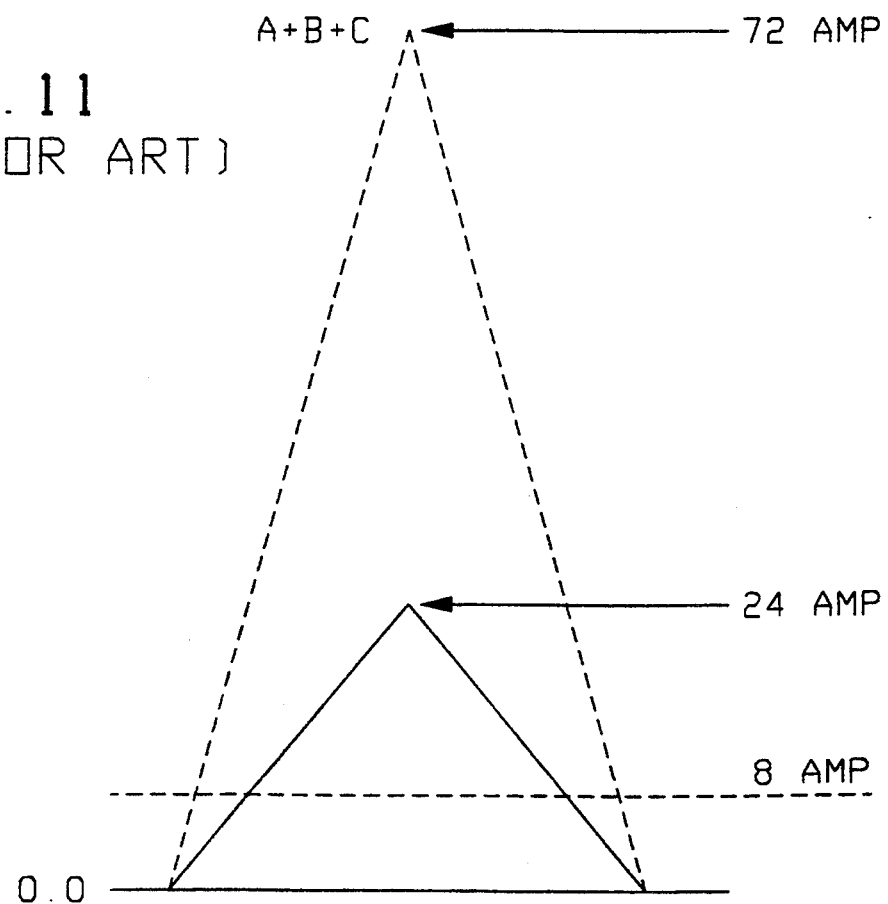
Figure 12:
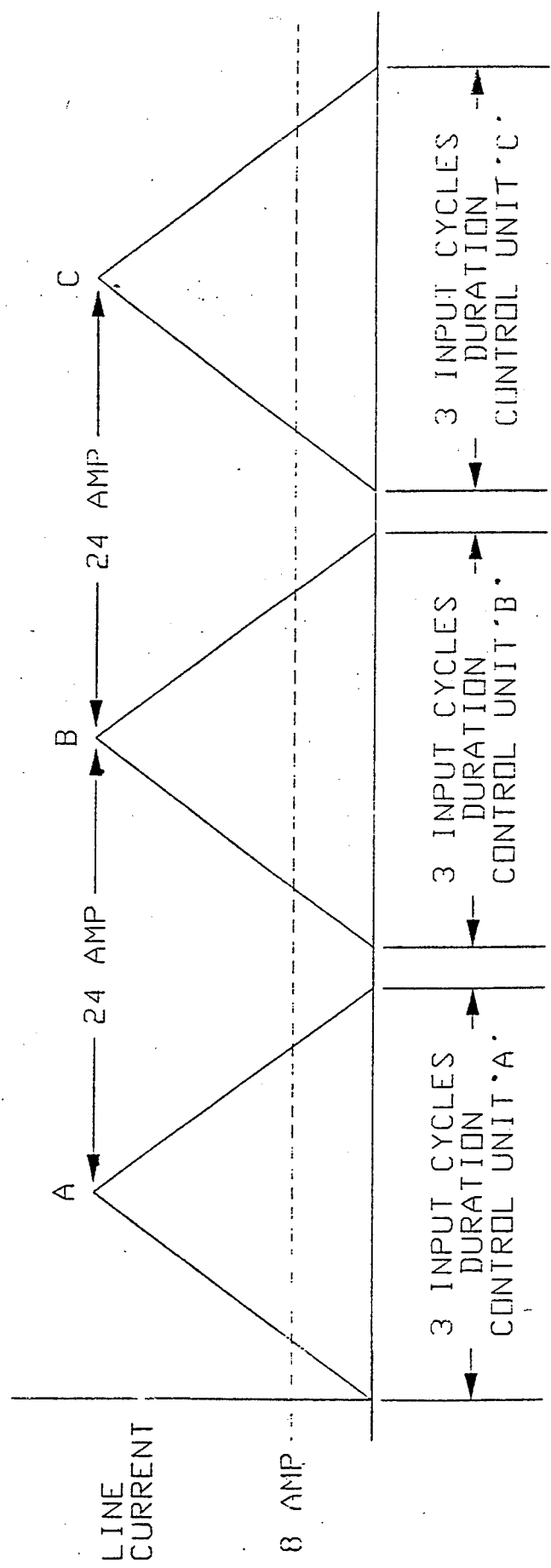

FIG. 4B shows how the cabinet frame, $A_f$, is used as a heat sink for the power distribution unit where there is seen the items previously noted in FIG. 1 and in FIG. 4A and which are indicated as the circuit breaker-O, the filter 7, the control units CU1, CU2, CU3, the solid state relays K1, K2, K3 and the three circuit breakers CB1, CB2 and CB3 which provide the alternating current output lines for J1, J2 and J3.

In connection with FIG. 1 it may be noted that inrush current protection is provided by the sequencing operation whereby the solid state relay K1 and its contact $25_1$ must be closed in order to permit current and voltage to be supplied to the terminal J1. Only after the contacts 25 of solid state relay K1 are closed, will power be applied to the control unit CU2 which will then permit the closure of contacts $25_2$ of solid state relay K2. Then after the solid state relay K2 and it's contacts $25_2$ are closed in order to empower the output terminal J2, then, and only then will there be the enabling of the control unit CU3 which will then permit the turning on of solid state relay K3 which will permit the closure of contacts $25_3$ thus to empower the AC output terminal J3. This set of sequencing operations thus ensure that only limited amounts of current and power will be delivered at any given moment of "turn-on" so that there is no possibility of excessive inrush current on the AC source line.

Each of the AC outputs (J3, J2, J1) are controlled by separate PDU control units. Control unit CU3 cannot turn on until unit CU2 is activated. Control unit CU2 cannot turn on until unit CU1 is activated. Control unit CU1 is activated by closure of the circuit breaker (CB). The three outputs are dependent upon activation of control unit CU1.

The TTL inputs to control units CU2 and CU3 are jumpered—preventing external digital control of those units. Control of all three outputs is dependent upon the digital control of unit CU1.

The turn-on period for each control unit is adjusted by the RC time constant of resistor 21 (R1) and capacitor 23 (C1, FIG. 2). Though the theoretical explanation of inrush current in this text is set on the basis of three cycles, good design practice requires a 50% safety factor. Thus, 5 cycles of input power is used as an acceptable sequence stabilization period, this sequence period being determined by the chosen values for resistor 21 and capacitor 23 of FIG. 2.

The control units shown in FIG. 1 which are designated as CU1, CU2, and CU3, are shown and described in greater detail in FIG. 2.

Referring to FIG. 2, there are seen the alternating current input terminals X and Y. In order for current and power to be applied to the loading resistor 30 ($R_L$), it is necessary that the contacts 25 of the solid state relay K1 be closed. Only when the contacts 25 are closed will it be possible for current and power to be delivered to the loading resistor 30 shown in FIG. 2.

The solid state relay K1, such as indicated in FIG. 2, is typically that manufactured by the OPTO 22 Manufacturing Company, located at 15461 Springdale Street in the City of Huntington Beach, Calif. and designated as part number 240D45-17.

Solid state relay K1 has operating contact 25 connected between terminals 1R and 2R. The light emitting diode (LED) 26, which causes contact closure, is connected between terminals 3R(+) and 4R(−). When a sufficient DC voltage is applied across terminals 3R and 4R, contact 25 closes, applying power to AC load 30. The control voltage for the LEO operating range is 3 to 32 VDC. K1 will turn on at 3 VDC and de-activate below 3 VDC. The contacts 3R and 4R of the solid state relay K1 are bridged by a rectifying unit designated 26.

In the present design configuration, the control unit circuitry (CU) will operate reliably over an input voltage range of 80 to 254 volts RMS between 48 and 62 Hz.

The solid state relay K1 in FIG. 2 is typically rated at 45 amperes. The circuit design will provide for a 30% derating, limiting the load current to 30 amperes maximum.

As seen in FIG. 2, there is provided an isolation transformer T1 which has a primary to secondary winding terms ratio of approximately 15/1. The secondary, open circuit voltage will vary approximately from 5.3 volts RMS up to 16.9 volts RMS when the input voltage at terminals X and Y ranges between 80 volts RMS and 254 volts RMS. The transformer T1 provides total electrical isolation between the high voltage alternating current input source and the low voltage DC control voltage across the terminals 22 and 24 of FIG. 2.

The secondary voltage of transformer T1 is applied to the half wave rectifier 20 and the filter network resistor 21 which places a DC voltage across the capacitor 23 (C1) in order to create the DC control voltage across terminals 22 and 24. The resistor 21 serves the purpose of protecting the circuitry from surge current damage, provides filtering and preventing damage to the transformer winding if the capacitor 23 is shorted. Typically the DC voltage across the capacitor 23 (C1) will vary as follows: The DC voltage across capacitor 23 will vary from 4.5 V to 14.5 V when the input voltage across input lines X and Y varies from low (80 VAC) to high (254 VAC) respectively. As previously mentioned, the resistor 21 and capacitor 23 provide an adjustment feature which can determine the number of input AC cycles required before energization of the next distribution channel in the sequential hierarchy.

The present invention description is that of a power distribution unit system which utilizes the cabinet frame as a heatsink. De-rating of the 45 ampere solid state relay ($K_1$) permits a 6000 watt load at 200 VAC while still using one ($K_1$) solitary relay. The power distribution system described herein provides for three load sources with each circuit path limited to 8 amperes, and protected by 10 ampere rated circuit breakers, CB1, CB2, CB3 of FIG. 1.

Where higher load capabilities are required, external heatsinks can be used instead of the frame as a heatsink. Fan cooling requirements would then be dependent upon heatsink size and air circulation. With changes in input wiring and input circuit breaker and filter, to accommodate 90 amperes from the AC source, three control units identical to those described in the present invention can accommodate 18,000 watts of load. Therefore; the control unit system provides great flexibility in design application.

Thus, loads of up to 8 amps to the loading resistor 30 of FIG. 2 can be accommodated by a single distribution line such as the distribution line D1 of FIG. 2.

In FIG. 2, there is seen a transistor 28 (Q1) connected to the terminal 4R of the solid state relay K1. The transistor 28 is a standard 2N2222 (NPN) transistor as manufactured by the Texas Instruments or Motorola company. The purpose of the transistor 28 (Q1) is to provide the capability of controlling the relay K1 with standard TTL logic (transistor to transistor logic). The solid state relay K1 (FIG. 2), is representative of the same type relays K2, K3—Km which form the distribution system of FIG. 1.

In FIG. 2, a resistor 29 is connected to the transistor 28 in order to limit base current of the transistor 28 in conjunction with Resistor $R_2$. External TTL logic circuitry 32 is used to control the operation of the transistor 28 (Q1) via a local control panel 33.

In FIG. 2, the Control Unit (CU) is seen to have input AC terminals 1C and 2C. The output to the relay K1 is through terminals 3C and 4C. Terminals 5C, 6C and 9C connect to the external controls 32, 33. The terminals 7C and 8C are available for Jumpers to permit automatic turn-on of the transistor 28 (Q1). Without a jumper across 7C and 8C, the control of transistor 28 is managed through external control 32 and or the local panel 33.

The local control panel switches, 33, permit local on-off switching of power to the Control Unit (CU) to enable/disable the relay K1 and the contactor 25.

Alternatively, an external remote control signal unit 32, can be used to operate through switch unit 33 to control power on/off of the Control Unit (CU).

The control unit (CU) is operable in one of three modes at any one time:
1. Continuous (Jumper between Pins 7C and 8C).
2. Local Power On/Off (Pins 6C and 9C).
3. Remote Power On/Off (Pins 5C and 6C).

When "continuous" operation is desired (over-riding both local and remote modes), a hard-wire jumper is connected between CU Pins 7C and 8C. This mode is used only in auto-sequencing, as used in FIG. 1.

When Local Mode is desired, there is no jumper between Pins 7C and 8C. Operation is dependent upon external switches S1 and S2 located in a local control panel, 33, FIG. 2. With switch S1 in "LOCAL" and switch S2 in PWR OFF, relay K1 is de-activated, cutting off power to resistor 30.

Switch S1 shorts CU Pins 5C and 6C, preventing transistor 28 (Q1) from turning on. The second contact of Switch S1 connects to the PWR ON side of Switch S2. When switch S2 is operated to the "PWR ON" position, connection is completed between Pins 6C and 9C via the local contact of S1 and the PWR ON contact of S2. The action bypasses transistor 28(Q1) to the load. With local power applied, relay K1 can be de-activated by operating Switch S2 to "PWR OFF" or operating Switch S1 to "REMOTE". When Switch S1 is in "LOCAL", external digital control 32 is locked out.

When Remote Mode is desired, Switch S1 is operated to the "REMOTE" position. Connection is completed form External Digital Control 32, through the remote contact of S1 to CU Pin 5C. The short is removed between CU Pin 5C and 6C and the local contact of Switch S2 is disconnected. S2 is inoperative when S1 is in the "REMOTE" position.

The external digital signal control 32 connected between CU Pins 5C and 6C with Switch S1 in the "REMOTE" position. When a transistor-to-transistor (TTL) logic high level is applied to CU Pins 5C and 6C, transistor 28 will conduct, causing relay K1 to activate and apply power to the external AC load 30. A "low" logic level will cause relay K1 to De-Activate.

The power distribution system of FIG. 1, quite differently from the aforementioned U.S. Pat. Nos. 4,769,555 and 4,663,539, can provide flexible operations via programming as will be indicated in connection with FIG. 1A.

FIG. 3 indicates a block diagram showing how the power distribution unit (PDU) takes a single input AC line and splits it into three separate AC power outlets, each of which outlet can handle a group of, for example, six localized power supplies. In FIG. 3, the power distribution unit 10 (as shown in more detail in FIG. 1) will provide three AC outputs designated J1, J2, and J3.

The main AC power source operates through the main circuit breaker on through connections via a connecting cable over to the PDU 10. The AC outputs of J1, J2, and J3 provide three power sources P1, P2 and P3 which are distributed respectively through distribution lines D1, which supply a group of power supplies. Thus the distribution line D1 supplies six power supplies designated PS 13 through PS 18. The distribution line, D2, supplies power supplies 7-12. The distribution line, D3, supplies power through the AC connectors involved to the power supplies PS 1 through PS 6.

While the systems in U.S. Pat. Nos. 4,769,555 and 4,663,539 operate on a "fixed" power-up and power-down sequence, the present invention permits a power-down to operate such that all levels in the power hierarchy can be turned off simultaneously even though the power-up sequence from CU1 to CU2 to CU3 is sequenced in a delayed ascending order.

A properly designed computer system will provide for all its disk drives and support circuitry to be shut down prior to turn-off of the primary AC source power. The present system permits this to occur without need for a step-by-step power down sequence.

Additionally, with external control signals for each control unit (CU), it is possible to select certain distribution lines for turn off without turning off the entire set of distribution lines in the system. Thus, the system lends itself to programmable flexibility as seen in the Truth Table of FIG. 1A.

Now with reference to FIGS. 2 and 1A, it is possible to remove the jumpers from terminals 7C and 8C (which had been used to automatically activate transistor 28) and instead to disconnect the local power, using switch S2 to cut out terminal 9C of FIG. 2 and then to connect digital input signals across terminals 5C and 6C in order to activate/deactivate transistor 28. Then each distribution line pair in the system can be operated according to the Truth Table of FIG. 1A. The Table of FIG. 1A shows flexibility indicating some eight possible program situations. Thus, when the first control unit CU1 is provided with a digital input at terminals 5C and 6C of FIG. 2, the input may be high H or low L. Likewise, the next hierarchical control unit CU2 may have high input or low input applied to terminals across terminals 7C and 8C. Similarly, the third hierarchical control unit CU3 may have high voltages H or low voltages L applied across terminals 7C and 8C.

Thus under the first program #1, the digital input to control unit i is low which means there is no AC output emanating on lines D1. Thus even though the digital input is high on the second control unit CU2 there is still no AC output on lines D2 and likewise even though the digital input across 7C and 8C in the third control unit CU3 is high, there is still no output.

This can be contrasted with, for example, program #5 where the digital input to the first control unit is high thus causing an output AC voltage on lines D1. Further, when the input to the second control unit CU2 is high, then also the AC output is energized on AC lines D2 and since the digital input to the third control unit CU3 is also high, then also it will be seen that the AC output on the lines D3 is also energized. Programs on line 6 and on line 8 (FIG. 1A) indicate that even though the power is turned-on in the first control unit, the power output in the second and third control units are disconnected. In program line 7, it is seen that the first and second control units have a high input even though the third control unit has a low input causing the third unit to have no AC voltage supplied on the lines D3.

Thus in FIG. 1A, there has been indicated 8 possibilities of programmed operation according to the externally provided High (H) and Low (L) signals to the terminals 5C and 6C of each of the control units CU1, CU2, CU3.

Then according to these externally provided input signals, there will be a determination of whether that given distribution line pair will be power-enabled (=1) or power disabled (=0).

Described herein has been a power distribution system providing "M" separate distribution line pairs where each line pair is monitored by a control unit. Each control unit can be jumpered for automatic operation to energize the next-in-sequence distribution line pair via a solid state relay. Alternatively, each control unit can be connected to receive external signals which will set up an operative/non-operative condition for the distribution line pair at the next level of hierarchy.

Packaging-wise, the minimal number and size of hardware elements permits installation to a computer cabinet frame which can serve as a heatsink.

While the preferred embodiment has been described in detailed architecture, it should be understood that the inventive concept is encompassed by the following claims.

What is claimed is:

1. A power distribution system for controlling power distribution to electrical loads connected to separate distribution channels in a supporting metallic cabinet frame, comprising:
    (a) means for distributing a unitary single alternating current power source into multiple distribution channels;
    (b) means for time-sequencing the application of power to each of the said distribution channels so that there will be no damaging inrush line currents;
    (c) means, in each of said distribution channels for controlling the activation or non-activation of alternating current flow to electrical loads in each of said distribution channels, each of said means including:
        (c1) solid state relay means having an on/off status to regulate the flow of current in the said distribution channel;
        (c2) power control unit means for controlling the on/off status of said solid state relay means and including:
            (c2a) circuit means for delaying the on-status of said solid state relay means for at least three AC input cycles and no longer than five AC input cycles when AC power is applied to said power control unit means.

2. The power distribution system of claim 1 wherein said metallic cabinet frame provides a heat sink for said solid state relay means and for said power control unit means.

3. The power distribution system of claim 2 wherein said power control unit means further includes:
    (a) means for developing a direct current (DC) control voltage which will regulate the closure time of said solid state relay means within certain prescribed voltage parameters applied to said solid state relay means.

4. The power distribution system of claim 3 wherein said power distribution system further includes:
    (a) external logic means to control the on-status of said solid state relay means, or to deactivate said relay means to the off-status, 5. The system of claim 4 wherein each said power control unit means (CU) includes switching means for causing the activation of said solid state relay means to an on-status.

6. A power distribution network for multiple electrical/electronic modules residing in a supporting cabinet together with said power distribution network, said network comprising:
    (a) means for segregating a single AC power source into multiple AC distribution channels to form a hierarchy of sequential distribution channels;
    (b) a plurality of solid state relay contact means for permitting or cutting off current flow in each of said AC distribution channels, each said solid state relay contact means being associated with a particular distribution channel;
    (c) a plurality of power control units, each of which is associated with a particular distribution channel and wherein each power control unit controls the on/off function of each associated solid state relay contact means, said control units being concatenated in a serial sequence to control power in said hierarchy of sequential distribution channels;
    (d) means for activating/deactivating each of said power control units from an external control means;
    (e) wherein at least three and no more than five AC input power cycles transpire in each power control unit before the next sequential power control unit in said hierarchy of sequential distribution channels is energized with AC power input;
    (f) said supporting cabinet providing a metallic frame for holding said multiple electrical/electronic modules and said plurality of power control units and solid state relay contact means.

7. The network of claim 6, wherein selected ones of the later-activated distribution channels in said hierarchy can be power de-activated without de-activating power to earlier-activated distribution channels.

8. The network of claim 6, which includes hardware support means for attachment to said metallic frame of said supporting cabinet to establish said cabinet as a heat sink.

9. Apparatus for activating a plurality of sets of electrical loads in a hierarchical sequence wherein the lower earlier-activated sets are empowered before the empowerment of the higher later-activated sets, said apparatus comprising:
    (a) a plurality of sets of electrical loads connected in sequential hierarchical configuration for power activation where each lower set is activated before activation of the next high set, each said next higher set being activated after a time delay of more than 3 and less than 5 AC cycles to prevent simultaneous addition of input surge currents;
    (b) a plurality of sets of AC power distribution lines operative hierarchically to sequentially enable power to activate each of said plurality of sets of electrical loads, said plurality of sets of AC power distribution lines forming a hierarchy of earlier-activated lower sets and later-activated higher sets, each set of power distribution lines including;
        (b1) solid state activation-deactivation switch means controlled by an associated control unit means;
    (c) a hierarchical plurality of said control unit means, each said control unit means associated with each set of electrical loads and each said control unit means including:

(c1) means to activate or de-activate said solid state switch means;
(d) a single main AC power source connected to said lowest hierarchical set of AC power distribution lines;
(e) metallic cabinet means for holding said plurality of sets of electrical loads and for encompassing said plurality of control unit means and solid state switch means as a heat sink.

10. The apparatus of claim 9 wherein each of said lower earlier activated control unit means converts AC power to a low DC voltage having a threshold value which enables said solid state switch means to activate the next higher set of AC power distribution lines.

11. The apparatus of claim 9 which includes:
(a) local control panel means connected to each of said control unit means for enabling de-activation of a selected set of AC power distribution liens to a selected set of electrical loads, without deactivating AC power to said lower sets of power distribution lines.

12. The apparatus of claim 9 which includes:
(a) remote control means connected to each of said control unit means for enabling de-activation of any selected set of AC power distribution lines without deactivating AC power to said lower sets of power distribution lines.

* * * * *